(12) United States Patent
Contreras et al.

(10) Patent No.: US 9,099,128 B1
(45) Date of Patent: Aug. 4, 2015

(54) IMPLEMENTING NOISE BASED DETECTION OF SPIN TORQUE OSCILLATOR POWER-ON IN MICROWAVE-ASSISTED MAGNETIC RECORDING (MAMR) HARD DISK DRIVES

(71) Applicant: HGST Netherlands B.V., Amsterdam (NL)

(72) Inventors: John Contreras, Palo Alto, CA (US); Samir Y. Garzon, San Jose, CA (US); Rehan Ahmed Zakai, San Ramon, CA (US)

(73) Assignee: HGST Netherlands BV, Amsterdam (NL)

( * ) Notice: Subject to any disclaimer, the term of this patent is extended or adjusted under 35 U.S.C. 154(b) by 0 days.

(21) Appl. No.: 14/526,367

(22) Filed: Oct. 28, 2014

(51) Int. Cl.
  G11B 5/00 (2006.01)
  G11B 5/455 (2006.01)
  G11B 27/36 (2006.01)

(52) U.S. Cl.
  CPC .............. *G11B 5/455* (2013.01); *G11B 27/36* (2013.01); *G11B 2005/0024* (2013.01)

(58) Field of Classification Search
  None
  See application file for complete search history.

(56) References Cited

U.S. PATENT DOCUMENTS

| 8,120,875 | B2 | 2/2012 | Takagishi et al. |
| 8,547,656 | B2 | 10/2013 | Igarashi et al. |
| 8,570,684 | B1 | 10/2013 | Contreras et al. |
| 2012/0262820 | A1 | 10/2012 | Matsumoto et al. |
| 2013/0148234 | A1 | 6/2013 | Morinaga et al. |

OTHER PUBLICATIONS

"Microwave power generated by a spin-torque oscillator in the presence of noise", IEEE Xplore, 2009 http://ieeexplore.ieee.org/stamp/stamp.jsp?tp=&arnumber=4829647&isnumber=4829590.

"Microwave power generated by a spin-torque oscillator in the presence of noise", by Vasil Tiberkevich, Andrei Slavin, and Joo-Von Kim, Applied Physics Letters 91, 192506 (2007); doi: 10.1063/1.2812546.

*Primary Examiner* — Wayne Young
*Assistant Examiner* — James L Habermehl
(74) *Attorney, Agent, or Firm* — Joan Pennington (57) ABSTRACT

A method, apparatus, and system are provided for implementing noise based detection of spin-torque oscillator (STO) power on for microwave assisted magnetic recording (MAMR) hard disk drives (HDDs). A low frequency noise generated by a spin-torque oscillator, such as noise in a frequency range between 10 kHz and 100 MHz, is detected. The detected STO noise is compared to a predefined threshold to identify STO power on operation.

20 Claims, 13 Drawing Sheets

IMPLEMENTING NOISE BASED DETECTION OF SPIN TORQUE OSCILLATOR POWER-ON IN MICROWAVE-ASSISTED MAGNETIC RECORDING (MAMR) HARD DISK DRIVES

FIELD OF THE INVENTION

The present invention relates generally to the data storage field, and more particularly, relates to a method, apparatus, and system for implementing noise based detection of spin-torque oscillator (STO) power-on for microwave assisted magnetic recording (MAMR) hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

Microwave Assisted Magnetic Recording (MAMR) uses a Spin Torque Oscillator (STO) to generate localized microwave radiation around the pole tip to improve the magnetic recording process. Using MAMR, magnetic media with high coercivity, which can not be recorded with conventional PMR (Perpendicular Magnetic Recording) technology, can in principle be used in order to increase the bit density. Just as the TMR (Tunneling Magneto Resistance) read element, STOs are very sensitive to ESD (Electro-Static Discharge) events, and therefore a need exists to detect whether an STO is operational and whether it has suffered degradation. Measurements of the STO resistance are not enough to determine whether the STO is operational, since undamaged STOs and shorted STOs sometimes have similar resistance.

Direct measurement of the STO oscillations, which occur in the tens of GHz frequency range is not possible at the HDD level. Instead, measurements of the STO resistance step, which occurs when the device turns ON or OFF as the STO bias is increased or decreased, have been proposed as a way to detect whether an STO is operational. However, when the STO is in the ON state, it can overwrite previously existing data on the disk, and thus the proposed resistance step detection methods can only be used for very short times, around 40 ns, as the head transitions from a servo zone to a data sector or from a data sector to a servo zone. Detecting the STO resistance step in under 40 ns is challenging and the techniques implemented so far show limited detectability due to reduced SNR. In addition, detecting the resistance step while data is being written is not possible since the resistance step is not visible when the write current oscillates at frequencies above a few hundred MHz One key issue in MAMR systems is to insure that the STO is oscillating. Without oscillation, assist effect will be absent and the magnetic field foot print and thus recording quality will suffer.

A need exists for effective mechanism for detection of spin-torque oscillator (STO) power-on and STO operation for microwave assisted magnetic recording (MAMR) hard disk drives (HDDs). It is desirable to provide such a mechanism with simple to implement circuit technique amenable to present preamp and front-end technologies for detecting the STO oscillation.

SUMMARY OF THE INVENTION

Aspects of the preferred embodiments are to provide a method, apparatus, and system for implementing noise based detection of spin-torque oscillator (STO) power on. Other important aspects of the preferred embodiments are to provide such method, apparatus, and system substantially without negative effect and to overcome some of the disadvantages of prior art arrangements.

In brief, a method, apparatus, and system are provided for implementing noise based detection of spin-torque oscillator (STO) power on for microwave assisted magnetic recording (MAMR) hard disk drives (HDDs). A low frequency noise generated by a spin-torque oscillator, such as noise in a frequency range between 10 kHz and 100 MHz, is detected. The detected STO noise is compared to a predefined threshold to identify STO power on operation.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system are provided for implementing spin-torque oscillator (STO) power-on and STO operation detection for microwave assisted magnetic recording (MAMR) hard disk drives (HDDs). A low frequency noise generated by a spin-torque oscillator, for example noise in a frequency range between 10 KHz and 100 MHz, is used to detect whether the STO is operational. An STO in the ON state has higher noise than an STO in the OFF state, testing whether the STO noise is above a certain threshold advantageously is used to determine proper STO operation. The STO noise remains present when the write current is toggled between positive and negative values during the recording process, the STO power ON detection method advantageously is used during write.

It should be understood that the preferred embodiments are not limited to the example noise frequency range of 10 KHz and 100 MHz. For example, an adjustable bandpass configuration can be used to select a desired range of frequencies that maximize a measurement signal to noise ratio (SNR) used to detect whether the STO is operational.

In accordance with features of the preferred embodiments, the noise-based STO power ON detector used during write, optionally operates throughout a data sector, for example, tens of microseconds, as opposed to a proposed resistance step based STO power on detector, which must operate within about 40 nanoseconds (ns). The difference of about 1000 in measurement time makes noise-based STO power ON detection much more reliable, having higher SNR.

Figure 1:
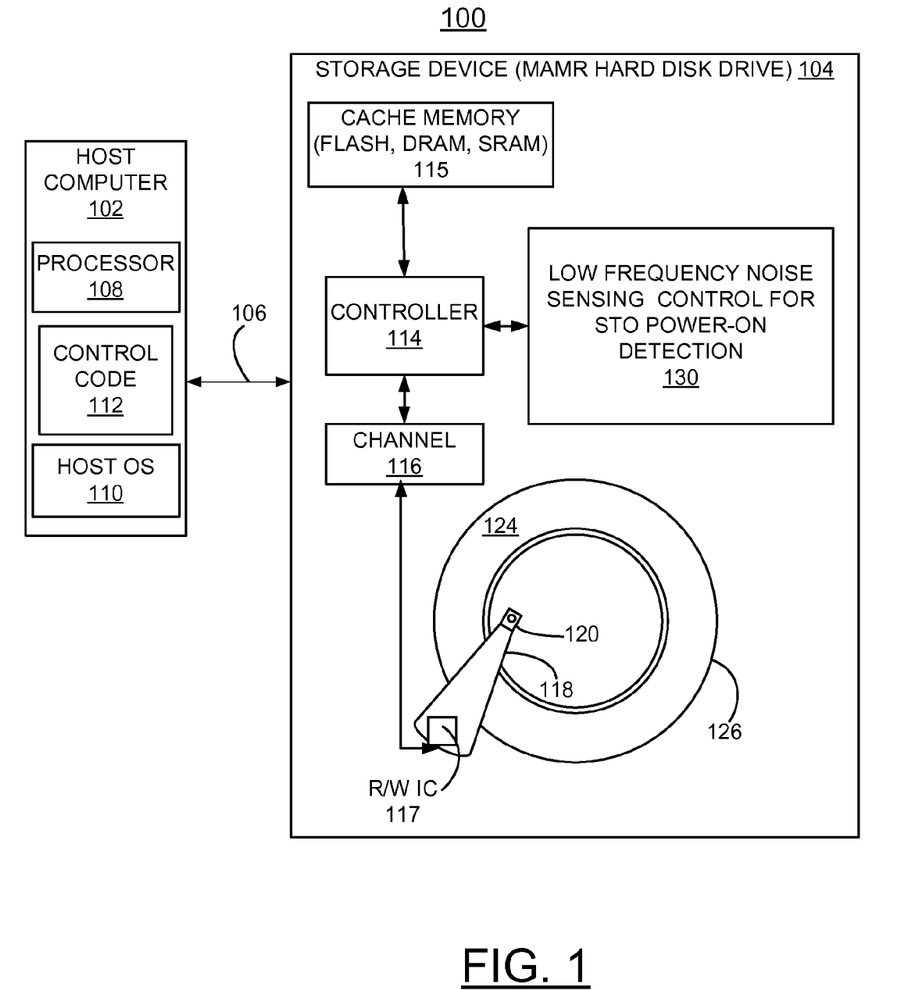
FIG. 1 is a block diagram representation illustrating a system for implementing noise based detection of spin-torque oscillator (STO) power on for microwave assisted magnetic recording (MAMR) hard disk drives (HDDs) in accordance with preferred embodiments.

Having reference now to the drawings, in FIG. 1, there is shown an example system generally designated by the reference character 100 for implementing spin-torque oscillator (STO) power-on and STO operation detection monitoring low frequency noise and resistance of an STO for microwave assisted magnetic recording (MAMR) hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or microwave assisted magnetic recording (MAMR) hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing spin-torque oscillator (STO) oscillation detection of the preferred embodiments. The storage device or hard disk drive 104 includes an arm 118 carrying a slider 120 for in accordance with preferred embodiments. The slider 120 flies over a writable disk surface 124 of a disk 126 and includes at least one STO for microwave assisted magnetic recording (MAMR), for example, integrated with the slider 120.

In accordance with features of preferred embodiments, a low frequency noise sensing control 130 for spin-torque oscillator (STO) power-on and STO operation detection is provided with the controller 114, for example, to identify STO power-on and proper STO operation. The STO power-on and STO operation detection advantageously is performed during write operation.

System 100 including the host computer 102 and the MAMR HDD 104 is shown in simplified form sufficient for understanding the present embodiments. The illustrated host computer 102 together with the storage device or HDD 104 is not intended to imply architectural or functional limitations. The present invention can be used with various hardware implementations and systems and various other internal hardware devices.

In accordance with features of preferred embodiments, spin-torque oscillator (STO) operation detection is provided to identify STO oscillation, used to ensure stable MAMR HDD write operation. Without STO oscillation, assist effect will be absent and the magnetic field foot print and thus recording quality will suffer.

Figure 2A:
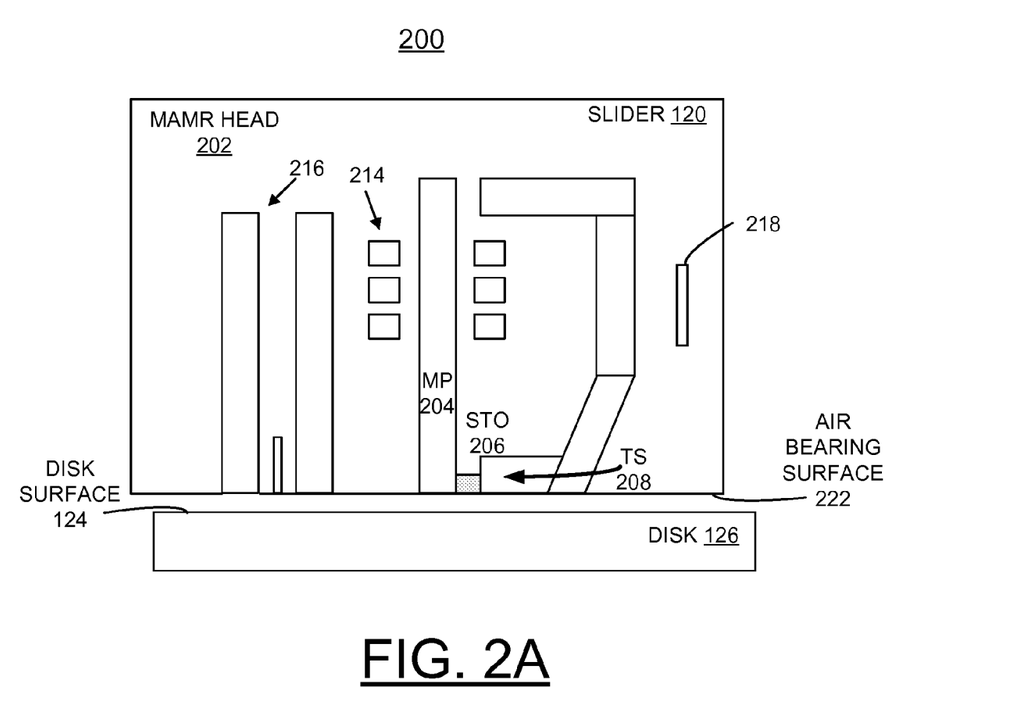
FIGS. 2A and 2B respectively schematically illustrate example apparatus and an example circuit for implementing noise based detection of spin-torque oscillator (STO) power on for microwave assisted magnetic recording (MAMR) hard disk drives (HDDs) in accordance with preferred embodiments.
Figure 2B:
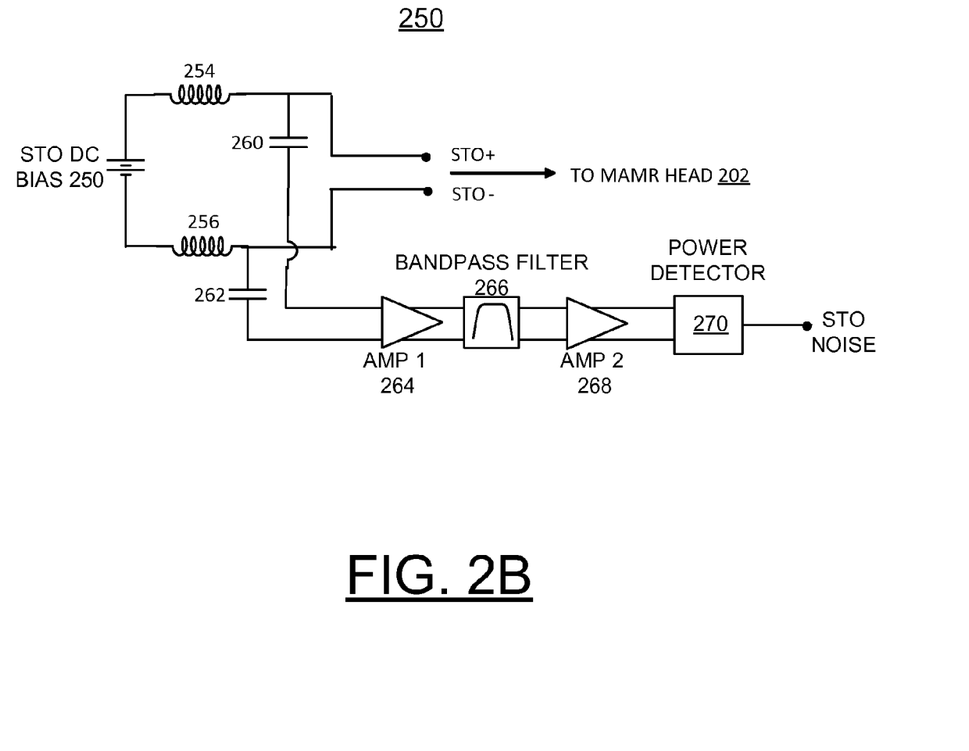

Referring now FIGS. 2A and 2B, there are shown example apparatus generally designated by the reference character 200 for implementing noise based detection of spin-torque oscillator (STO) operation for microwave assisted magnetic recording (MAMR) hard disk drives (HDDs) and an example STO power-on and STO operation detection circuit generally designated by the reference character 250 of the preferred embodiments.

The example STO power-on and STO operation detection circuit 250 is provided, for example, in the Read/Write (R/W) integrated circuit (IC) 117 or preamplifier 117. STO power-on and STO operation detection circuit 250 effectively determines whether a spin-torque oscillator (STO) 206 is oscillating.

As shown in FIG. 2A, the power-on and STO operation detection apparatus 200 includes a recording head 202, such as a MAMR head 202 provided with the slider 120. The MAMR head 202 includes a main magnetic pole (MP) 204, a spin-torque oscillator (STO) 206, and a trailing shield 208 of a head writer. As shown, the MAMR head 202 includes a coil 214 positioned proximate the main magnetic pole MP 204, a reader 216, and a thermal flying height control 218. The MAMR head 202 includes the air bearing surface 222 of the MAMR head 202 that is disposed proximate to the disk surface 124 of disk 126.

In accordance with features of the preferred embodiments, during operation of STO power-on and STO operation detection circuit 250 the low frequency noise generated by the STO 206 is used to detect whether the STO is operational. A write coil current source applies a pulsed write current to the write coil 204 while a DC bias current is applied to the STO 206. STO power-on and STO operation detection circuit 250 performs noise detection providing a STO noise output to be compared with an expected level to detect the ON state of the STO 206. The STO power-on and STO operation detection circuit 250 advantageously is used during data write, resulting in better detection than other methods for detecting STO power-ON.

As shown in FIG. 2B, the power-on and STO operation detection circuit 250 includes a STO DC bias source 252 respectively coupled to the STO 206 in the MAMR head 202 by a pair of inductors 254, 256, with a pair of capacitors 260, 262 respectively providing inputs to a first differential amplifier 264. A differential output of the first differential amplifier 264 is applied to a bandpass filter 266 providing inputs to a second differential amplifier 268. For example, the bandpass filter 266 implements an adjustable bandpass filter having adjustable low and high frequency poles. A differential output of the second differential amplifier 264 is applied to a power detector 270 that provides a STO noise output that is compared with an expected level for detecting STO power-ON.

It should be understood that the preferred embodiments are not limited to the example power-on and STO operation detection circuit 250. Various other detection circuits could to used to detect noise generated by a spin-torque oscillator that is compared with an expected level for detecting STO power-ON.

Figure 3A:
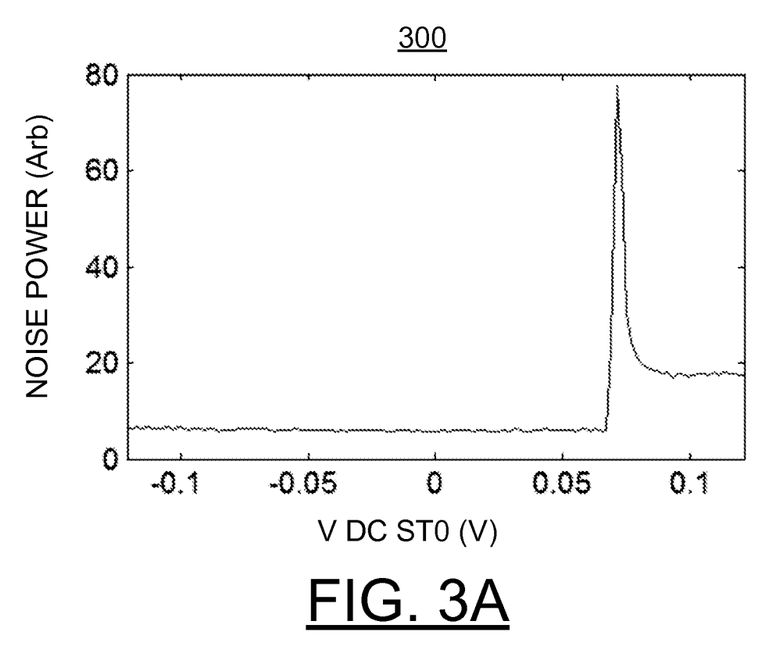
FIGS. 3A and 3B respectively illustrate example waveforms of respective example measured noise and resistance step of an STO as a function of STO bias for a static write current in accordance with preferred embodiments.
Figure 3B:
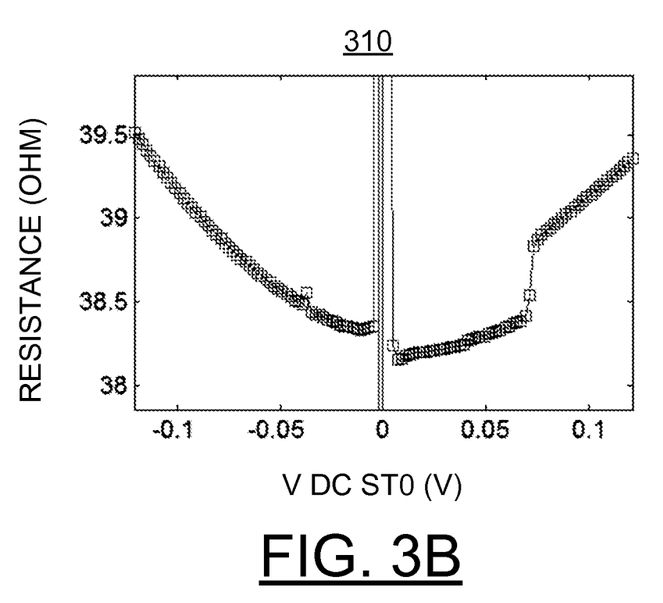

Referring now to FIGS. 3A and 3B, there are shown example waveforms of respective example measured noise generally designated by the reference character 300 and resistance step of an STO generally designated by the reference character 310 as a function of STO bias voltage in accordance with preferred embodiments. For example, waveforms 300, 310 are shown for a static write current, such as a static write current Iw equal to 20 mA. As the STO bias increases above 70 mV, the STO resistance suddenly increases indicating that the STO has been powered ON, as shown in FIG. 3B. During STO power ON, the low frequency noise (10 kHz-100 MHz) shows a large peak due to random telegraph noise (STO jumps between OFF and ON states), as shown in FIG. 3A. When the STO bias is well above STO power ON threshold, the noise decreases, and remains constant at a value higher than the noise measured during the STO OFF state. This data demonstrates the correlation between the resistance step and the increased low frequency noise in the accordance with preferred embodiments enabling effective operation of STO power-on and STO operation detection circuit 200.

Figure 4A:
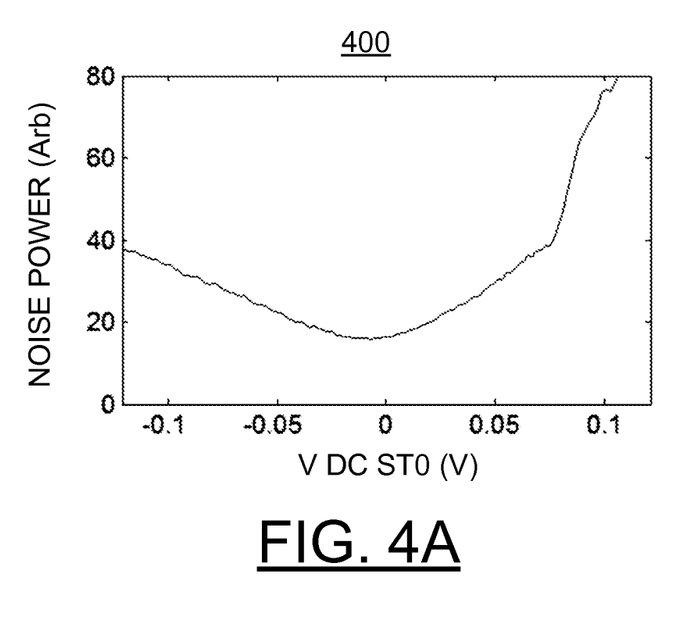
FIGS. 4A and 4B respectively illustrate example waveforms of respective example measured noise and resistance step of an STO as a function of STO bias for a quasi-random data write current in accordance with preferred embodiments.
Figure 4B:
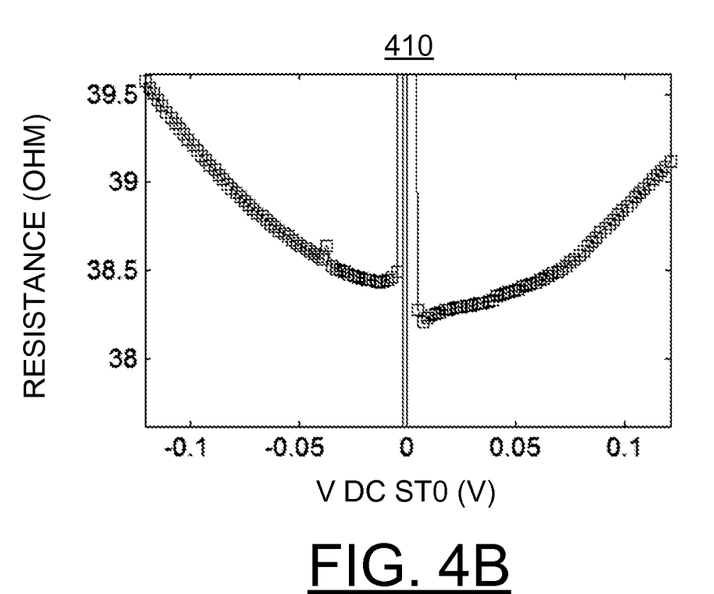

Referring now to FIGS. 4A and 4B, there are shown example waveforms of respective example measured noise generally designated by the reference character 400 and resistance step of an STO generally designated by the reference character 410 as a function of STO bias voltage in accordance with preferred embodiments. For example, waveforms 400, 410 are shown for write current that toggles between positive and negative values as quasi-random data is being recorded. The illustrated waveforms 400, 410 are shown for write current being a pseudo-random bit stream (PRBS) pattern with an amplitude of 23 mA. In FIG. 4B, the resistance step can no longer be seen, but instead there is a subtle slope change in the resistance plot 410 as the STO bias increases above 70 mV. As shown in FIG. 4A, the noise power also looks different than with the static write current Iw shown in FIGS. 3A and 3B, but the onset of increased noise is clearly visible at 70 mV. The noise data shown in FIG. 4A was obtained in 20 us, comparable to the duration of the data sector in typical HDDs, demonstrating the concept that low frequency noise advantageously is used to detect STO power ON enabling effective operation of STO power-on and STO operation detection circuit 200. If during write operation the STO power ON detector circuit 200 does not indicate that the STO has powered ON correctly, then procedures can be taken to rewrite the data or re-optimize the STO bias. For the data in FIG. 4A, if the STO operating point was chosen at 90 mV, and the STO ON threshold was defined at an integrated noise level of 50, accurate detection of the STO operation is easily achieved.

Figure 5A:
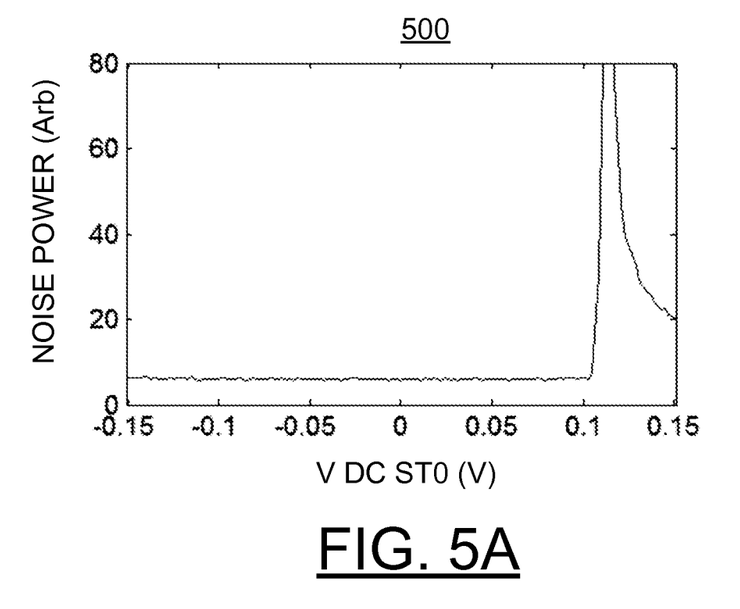
FIGS. 5A and 5B respectively illustrate further example waveforms of respective example measured noise and resistance step of an STO as a function of STO bias for a static write current in accordance with preferred embodiments.
Figure 5B:
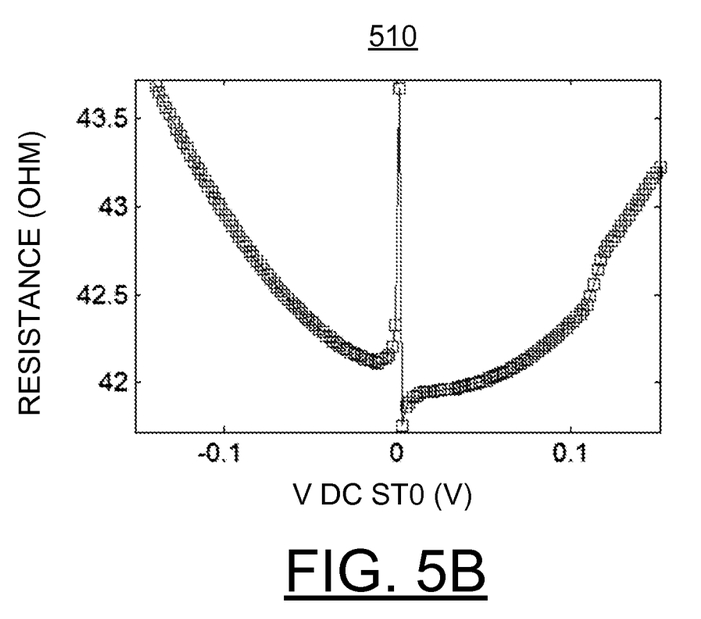

Referring now to FIGS. 5A and 5B, there are shown further example waveforms of respective example measured noise generally designated by the reference character 500 and resistance step of an STO generally designated by the reference character 510 as a function of STO bias voltage in accordance with preferred embodiments. For example, waveforms 500, 510 are shown for a static write current, such as a static write current Iw equal to 20 mA, as for the waveforms 300, 310 in FIGS. 3A and 3B. For example, waveforms 500, 510 illustrate operation after STO degradation where the voltage required to power ON the STO increases as shown in FIG. 5A, and the size of resistance step decreases as shown in FIG. 5B where the resistance and noise were measured with a constant Iw equal to 20 mA to compare step size and location with the waveforms 300, 310 in FIGS. 3A and 3B.

Figure 6A:
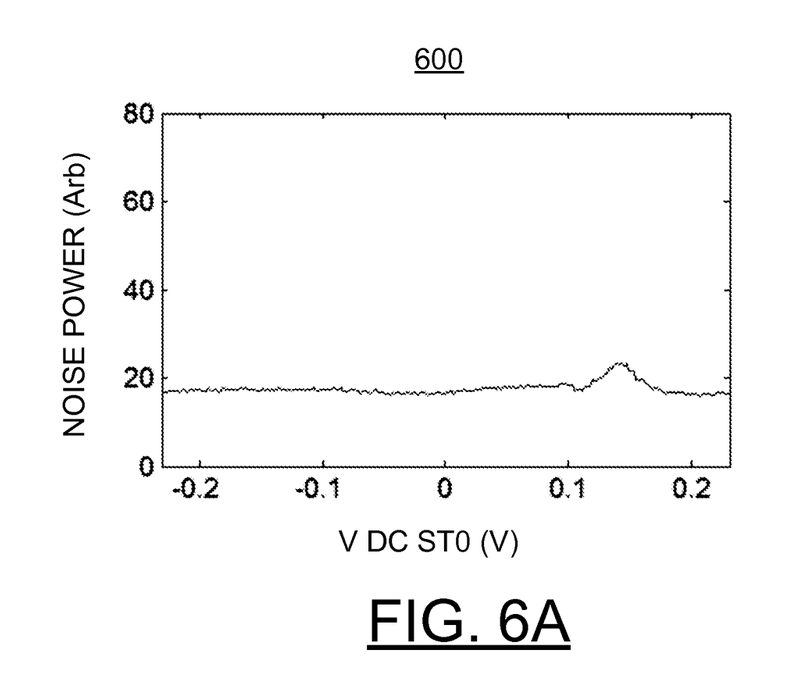
FIGS. 6A and 6B respectively illustrate example waveforms of respective example measured noise and resistance step of an STO as a function of STO bias for a quasi-random write current in accordance with preferred embodiments.
Figure 6B:
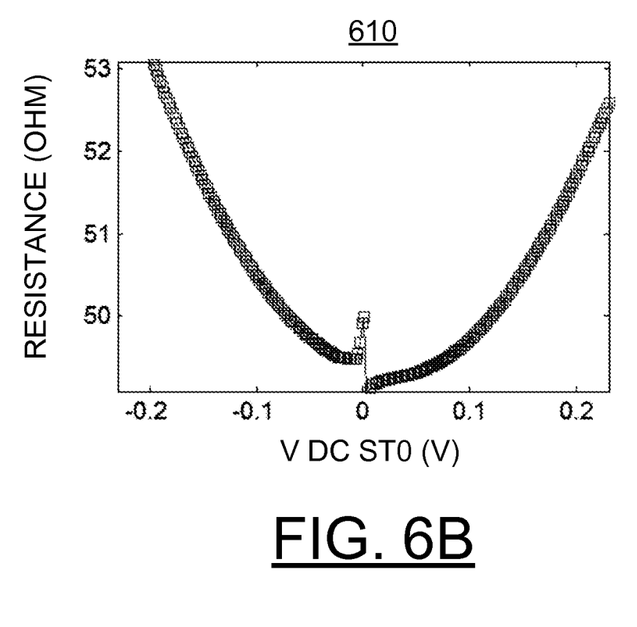

Referring now to FIGS. 6A and 6B, there are shown further example waveforms of respective example measured noise generally designated by the reference character 600 and resistance step of an STO generally designated by the reference character 610 as a function of STO bias voltage in accordance with preferred embodiments. For example, waveforms 600, 610 are shown for write current that toggles between positive and negative values as quasi-random data is being recorded, as shown for the illustrated waveforms 400, 410 for write current being a pseudo-random bit stream (PRBS) pattern with an amplitude of 23 mA. In FIGS. 6A and 6B, the waveforms 600, 610 illustrate more severe STO damage than the STO degradation illustrated by waveforms 500, 510.

In FIGS. 6A and 6B, after more severe damage the STO step can not be seen in static measurements, and with write current Iw equal to PRBS the noise becomes almost completely flat in waveform 600. A small noise peak still can be seen at 130 mV, which suggests that there is still some STO activity, but the noise power above and below 130 mV is quite similar in waveform 600 of FIG. 6A. Using the criteria defined above for (operating point of 90 mV and threshold at a noise level of 50, the STO detector would clearly determine that the STO did not power ON correctly in FIG. 6A. If damage was not severe, like in FIGS. 5A and 5B, re-optimization of the bias and threshold would allow continued operation of the HDD 104, but the severe damage shown in FIGS. 6A and 6B would mean end of life (EOL) for the HDD.

Figure 7:
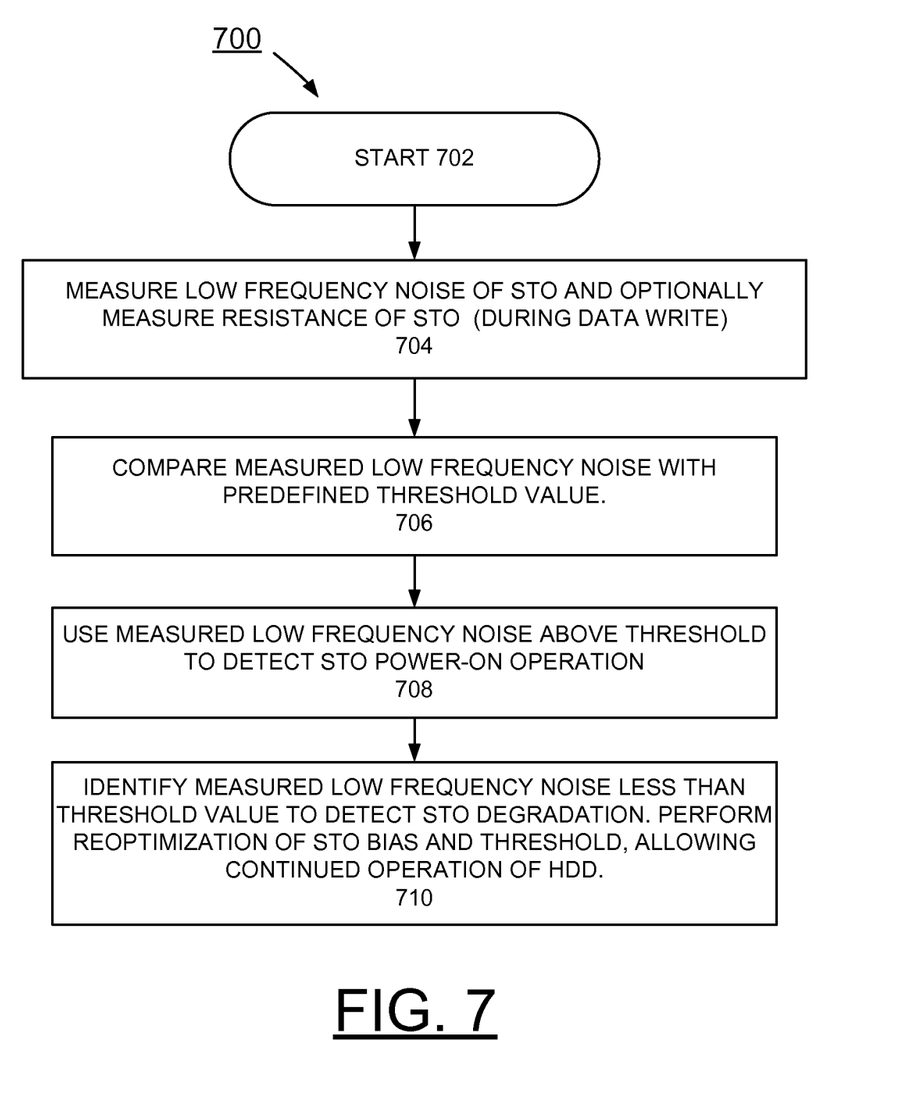
FIG. 7 is a flow chart illustrating example operations for implementing noise based detection of spin-torque oscillator (STO) power ON in MAMR HDDs in accordance with preferred embodiments.

Referring now to FIG. 7 there is shown a flow chart illustrating example operations generally designated by the reference character 700 for implementing noise based detection of spin-torque oscillator (STO) power ON in MAMR HDDs in accordance with preferred embodiments starting at a block 702. As indicated in a block 704, low frequency noise, such as 10 kHz-100 MHz noise of the STO is measured and optionally resistance of the STO is measured during data write. Then the measured low frequency STO noise is compared with a predefined threshold value as indicated in a block 706. The measured low frequency noise above the threshold is used to detect STO power on operation as indicated in a block 708. As indicated in a block 710, the measured low frequency noise below the threshold is used to identify STO degradation, and re-optimization of STO bias and threshold is performed, allowing continued operation of the HDD.

Figure 8:
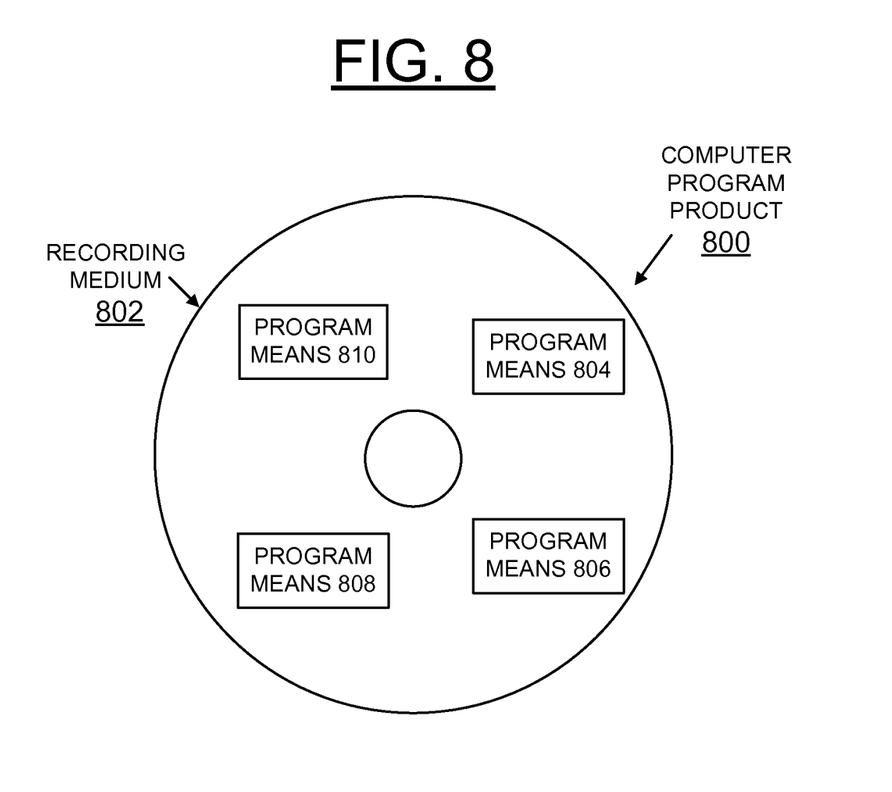
FIG. 8 is a block diagram illustrating a computer program product in accordance with preferred embodiments.

Referring now to FIG. 8, an article of manufacture or a computer program product 800 of the preferred embodiments is illustrated. The computer program product 800 includes a computer readable recording medium 802, such as, a floppy disk, a high capacity read only memory in the form of an optically read compact disk or CD-ROM, a tape, or another similar computer program product. Computer readable recording medium 802 stores program means or control code 804, 806, 808, 810 on the medium 802 for carrying out the methods for implementing spin-torque oscillator (STO) power on and STO operation detection for MAMR hard disk drives in accordance with preferred embodiments in the system 100 of FIG. 1.

A sequence of program instructions or a logical assembly of one or more interrelated modules defined by the recorded program means or control code 804, 806, 808, 810, direct HDD controller 114 using respective spin-torque oscillator (STO) circuit 250 of the system 100 to monitor STO power on and STO operation during MAMR HDD operation of preferred embodiments.

While the present invention has been described with reference to the details of the embodiments of the invention shown in the drawing, these details are not intended to limit the scope of the invention as claimed in the appended claims.

What is claimed is:

1. A method for implementing noise based detection of spin-torque oscillator (STO) power on for microwave assisted magnetic recording (MAMR) hard disk drives (HDDs) comprising:
   detecting predefined low frequency noise generated by a spin-torque oscillator, and
   comparing the detected STO noise to a predefined threshold to identify STO power on operation.

2. The method as recited in claim 1, wherein detecting predefined low frequency noise generated by a spin-torque oscillator includes detecting noise generated by the spin-torque oscillator in a frequency range between 10 kHz and 100 MHz.

3. The method as recited in claim 1, wherein detecting predefined low frequency noise generated by a spin-torque oscillator includes applying a static write current.

4. The method as recited in claim 1, wherein detecting predefined low frequency noise generated by a spin-torque oscillator includes applying a pulsed write current between positive and negative values for data write.

5. The method as recited in claim 1, wherein detecting predefined low frequency noise generated by a spin-torque oscillator includes applying a direct current (DC) bias voltage to the spin-torque oscillator (STO).

6. The method as recited in claim 1, comparing the detected STO noise to a predefined threshold to identify STO power on operation includes identifying detected STO noise above the predefined threshold to identify STO power on operation.

7. An apparatus for implementing noise based detection of spin-torque oscillator (STO) power on for microwave assisted magnetic recording (MAMR) hard disk drives (HDDs), comprising:
   a controller;
   at least one disk; said disk including a disk media for storing data;
   a spin-torque oscillator (STO) for microwave assisted magnetic recording (MAMR);
   a spin-torque oscillator (STO) power on detection circuit comprising
   a noise detector for detecting predefined low frequency noise generated by a spin-torque oscillator, and
   a comparator coupled to said noise detector for comparing the detected STO noise to a predefined threshold to identify STO power on operation.

8. The apparatus as recited in claim 7 includes control code stored on a non-transitory computer readable medium, and wherein said controller uses said control code to identify STO power on and STO operation.

9. The apparatus as recited in claim 7 includes a Read/Write integrated circuit (IC) coupled to a slider, said slider containing said spin-torque oscillator (STO); said noise detector and said comparator provided in said Read/Write integrated circuit (IC).

10. The apparatus as recited in claim 7 includes said noise detector detecting noise generated by the spin-torque oscillator in an adjustable frequency range with a filter including adjustable low and high frequency poles.

11. The apparatus as recited in claim 7 includes said noise detector detecting noise generated by the spin-torque oscillator during write operation.

12. The apparatus as recited in claim 7 includes a direct current (DC) bias source applying a DC bias voltage to the spin-torque oscillator (STO).

13. The apparatus as recited in claim 7 includes a write current source applying a static write current.

14. The apparatus as recited in claim 7 includes a write current source applying a pulsed write current between positive and negative values for data write.

15. A system for implementing noise based detection of spin-torque oscillator (STO) power on comprising:
   a microwave assisted magnetic recording (MAMR) hard disk drive (HDD), said MAMR HDD comprising a controller;
   at least one disk; said disk including a disk media for storing data;
   a spin-torque oscillator (STO) for microwave assisted magnetic recording (MAMR);
   a spin-torque oscillator (STO) power on detection circuit comprising
   a noise detector for detecting predefined low frequency noise generated by a spin-torque oscillator, and
   a comparator coupled to said noise detector for comparing the detected STO noise to a predefined threshold to identify STO power on operation.

16. The system as recited in claim 15 includes control code stored on a non-transitory computer readable medium, and wherein said controller uses said control code to identify STO power on and STO operation.

17. The system as recited in claim 15 includes a Read/Write integrated circuit (IC) coupled to a slider, said slider containing said spin-torque oscillator (STO); and said Read/Write integrated circuit (IC) implementing said noise detector and said comparator comparing the detected STO noise to a predefined threshold to identify STO power on operation.

18. The system as recited in claim 15 includes a STO bias source applying a DC STO bias voltage to the spin-torque oscillator (STO).

19. The system as recited in claim 15 wherein said noise detector detects predefined low frequency noise generated by a spin-torque oscillator in an adjustable frequency range.

20. The system as recited in claim 15 wherein said noise detector detects predefined low frequency noise generated by a spin-torque oscillator during write operation.

* * * * *